B. J. COBB.
NUT LOCK.
APPLICATION FILED DEC. 14, 1911.
1,064,711.
Patented June 17, 1913.
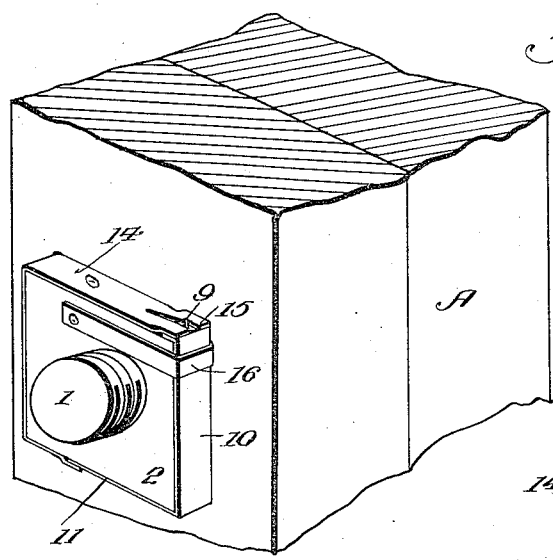
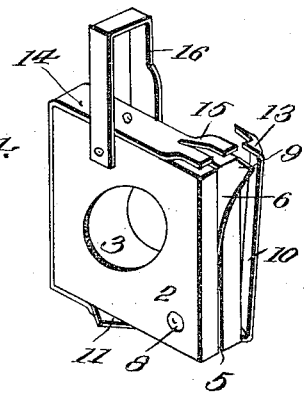
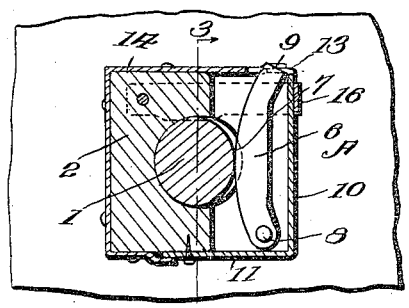
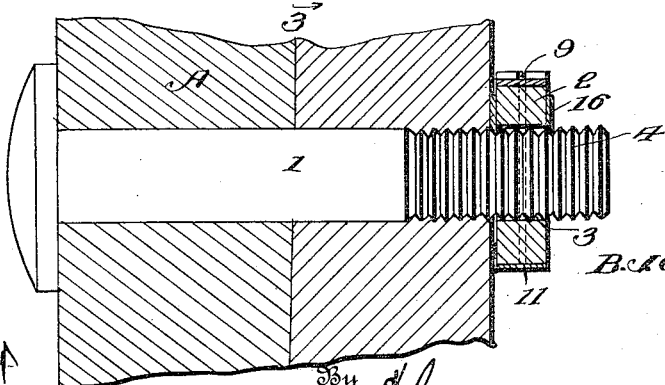
Inventor
B. J. Cobb.
Witnesses
By
Attorney.
COLUMBIA PLANOGRAPH CO., WASHINGTON, D. C.

UNITED STATES PATENT OFFICE.

BENJAMIN J. COBB, OF ROME, GEORGIA.

NUT-LOCK.

1,064,711.　　　　　Specification of Letters Patent.　　Patented June 17, 1913.

Application filed December 14, 1911. Serial No. 665,691.

*To all whom it may concern:*

Be it known that I, BENJAMIN J. COBB, citizen of the United States, residing at Rome, in the county of Floyd and State of Georgia, have invented certain new and useful Improvements in Nut-Locks, of which the following is a specification.

This invention relates to lock nuts, and more particularly to a combined threadless nut and lock.

The main object of the invention is to produce a lock nut having a threadless bore and provided with a clamping member adapted to engage the threads of the bolt so that when the clamping member is released, the nut may be directly withdrawn from said bolt without the necessity of going through the tedious process of unscrewing the nut.

A further object is the provision of a lock nut adapted to slide onto a bolt and be securely held in engagement therewith by a clamping member which detachably engages the threaded portion of the bolt.

A still further object is the provision of a device of this character, the construction of which is such as to insure ease and cheapness in its manufacture and durability and strength and efficiency in use.

Further objects and advantages will appear in the following description, it being understood that various changes in form, proportions, and minor details of construction may be resorted to in the scope of the appended claims.

For a full understanding of the invention reference is to be had to the following description and accompanying drawing, in which:—

Figure 1 is a perspective of the improved nut lock in operation; Fig. 2 is a vertical section of the same showing the clamping mechanism; Fig. 3 is a section on the line 3—3 of Fig. 2; Fig. 4 is a perspective view of the nut lock disengaged from the bolt.

Corresponding and like parts are referred to in the following description and indicated in all the views of the accompanying drawings by the same reference characters.

For the purpose of illustration the improved lock-nut of this invention is shown mounted on a standard bolt 1 which passes through the work A. The nut 2 has a threadless bore 3 which receives the threaded portion 4 of the bolt and conforms closely to its threads. Communicating with the bore of the nut at a right angle thereto is a slot 5 which extends preferably the whole length of one side of the nut.

A clamping member preferably in the form of a flat blade 6, having its inner side 7 convex, to engage a bolt, is pivoted in the slot 5 by a pin or rivet 8 which passes through the nut. The free end 9 of the blade projects beyond the adjacent side of the nut and is engaged by a locking device. This locking device includes a flat spring 10 having an angularly disposed portion 11, which latter is pivoted to the side of the nut adjacent the rivet 8. The straight portion 10 of the spring is adjacent the slotted side of the nut and the free end 13 of said spring is bent inwardly and bifurcated to engage the free end of the blade 6. When not so engaged the spring is free to swing and permit the blade 6 to be operated.

It will here be noted that when the device is in operation, as in Fig. 1 the spring 10 closes the greater portion of the slot 5 and thus pervents the entrance of dirt, and the like.

The remaining portion of the slides of the nut is covered by an angular band or keeper 14 which preferably overlaps the pivoted end of the spring 10 and extends around the nut until it meets or overlaps the end 13 of the spring, there being a slot 15 in said band to accommodate the protruding end 9 of the blade 6 and to act as a guide to the latter.

In order to secure the bifurcation 13 of the spring 10 in engagement with the free end 9 of the clamping blade and thus cause the curved portion 7 thereof to engage the bolt, a pivoted U-shaped clip 16 embraces the nut and is adapted to swing into engagement with the spring 10 and hold the latter in proximity to the adjacent side of the nut. This, of course, causes the spring 10 to bear against the bar 6 and force the latter into engagement with the threads of the bolt passing through the bore of the nut.

In using the device the bolt 1 is passed through the work A. The locking device of the nut 2 is released so that the clamping blade 6 may swing outwardly and permit the smooth bore 3 of the nut to slide over the threaded portion 4 of the bolt. Thereafter the blade 6 is pressed inwardly so that it engages the threaded portion of the bolt and prevents the withdrawal of the nut.

The bifurcated end 13 of the spring 10 is caused to engage the free end of the blade 6 and the parts are securely locked in this relation by the pivoted clip 16 which engages the outer face of the spring.

Attention is directed to the fact that the spring 10 is pivoted to the nut 2 and is thus enabled to swing away from the slot 5 to permit the blade 6 to be readily disengaged from the threads of the bolt. The pivoted end of the spring being overlapped by the angular band 14, is thus prevented from bulging up should it become worn at the pivoting point. The bifurcated end of the spring is overlapped by the other end of the band 14, which gives a smooth finished appearance to the nut and insures the proper seating of the spring 10.

It is desired to further direct the attention to the blade 6 which if driven forcibly into the threads of the bolt, is caused to conform to said threads and thereby lock the parts in engagement. When force is not used to seat the blade 6, the latter disposes itself at a right angle to the axis of the bolt and slightly across the threads thereof. In either case the nut is locked against accidental removal.

In some cases the nut lock of this invention could be used merely as a lock in connection with standard nuts and in this connection would of course be relieved of a large part of the strain.

The construction of a lock nut in accordance with this invention permits the nut to be placed on and withdrawn from a bolt without necessitating the tedious process of screwing up or unscrewing the nut, and thereby a vast amount of time and labor is saved.

This device is simple and durable in its construction and can be manufactured at a relatively low cost.

Having thus described and specifically set forth the merits of the device it is hereby claimed:—

1. A lock nut having a slot in one side communicating with its bore, a bolt-engaging member pivoted in said slot and adapted to intersect the bore, a locking member pivoted on one side of the nut and adapted to cover said slot and engage the bolt-engaging member, and a keeper secured to the nut and having an end overlapping the free end of the locking member.

2. A lock nut having a slot in one side communicating with its bore, a bolt-engaging member pivoted in said slot and adapted to intersect the bore, a locking member pivoted on one side of the nut and adapted to cover said slot and engage the bolt-engaging member, a keeper secured to the nut and having an end adapted to overlap the free end of the locking member, and a clip pivoted on the nut and adapted to extend over the locking member between the ends of the same.

3. A lock nut having a threadless bore and provided with a slot communicating therewith, a bolt engaging blade pivoted in said slot and having its free end extended beyond the adjacent side of the nut, a spring pivoted to the nut and adapted to be held in depressed engagement with the free end of the blade, and a locking member adapted to engage the spring and hold the latter in engagement with the blade.

4. A lock nut having a threadless bore and provided with a slot communicating therewith, a bolt engaging blade pivoted in the slot and having its free end extended beyond the adjacent side of the nut, an angular spring covering the slotted side of the nut and capable of pivotal movement to expose said slot, the free end of the spring being angularly disposed and bifurcated to engage the free end of the bolt-engaging blade, and means for retaining the spring in engagement with the blade.

5. A lock nut having a threadless bore and provided with a slot communicating therewith, a bolt-engaging blade pivoted in the slot and having its free end extended beyond the adjacent side of the nut, a locking member pivoted to the nut and having its free end adapted to engage the blade, and a U-shaped clip pivoted to the nut and adapted to engage the spring and secure the latter in engagement with the blade.

In testimony whereof I affix my signature in presence of two witnesses.

BENJAMIN J. COBB. [L. S.]

Witnesses:
C. A. THORNWELL,
G. W. SIMS.

Copies of this patent may be obtained for five cents each, by addressing the "Commissioner of Patents, Washington, D. C."